UNITED STATES PATENT OFFICE.

CYRUS F. WILLARD, OF SAN DIEGO, CALIFORNIA.

DEVULCANIZING PROCESS AND PRODUCT THEREOF.

1,322,151.  Specification of Letters Patent.  Patented Nov. 18, 1919.

No Drawing.  Application filed March 18, 1918.  Serial No. 223,208.

*To all whom it may concern:*

Be it known that I, CYRUS F. WILLARD, a citizen of the United States, residing in San Diego, in the county of San Diego and State of California, have invented certain new and useful Improvements in Devulcanizing Processes and Products Thereof, of which the following is a specification.

The present invention relates to improvements in processes of devulcanizing rubber and particularly to a process of devulcanizing rubber in the presence of fiber, without destroying the fiber, and the product obtained by such steps.

When rubber scrap is devulcanized by the processes heretofore employed it loses that quality which is known as its "nerve" or "tone", and the lack of which is evidenced by the decreased strength, resiliency, vitality and durability of the devulcanized rubber. It has therefore heretofore been necessary to further treat such devulcanized rubber to restore, in so far as is possible, its plasticity and "nerve" or vitality or to mix it with new rubber for re-use.

In an earlier application, Serial Number 171,923, I have disclosed a process whereby devulcanization is effected in such manner as to avoid the defects of prior processes and obtain a product which is "live", plastic and capable of vulcanization, possessing to a high degree the properties characteristic of new rubber. My present invention consists in a modification of the process disclosed in said application whereby I am able to obtain a product in which the properties of new rubber are retained to an even greater extent than by my prior process, and by which I am enabled to treat vulcanized rubber in the presence of fiber, and particularly of vegetable fiber to devulcanize the rubber without impairing the properties of the fiber. Most processes heretofore practised have aimed at destroying the fiber in rubber scrap in order to be able to reclaim the rubber. By the process hereinafter described it is possible to reclaim the fiber as well as the rubber and retain a product different from anything heretofore produced. By utilizing the treated fiber or fabric, which has been wasted in the processes now in use, and forming a mixture or association of such fiber and the devulcanized rubber, I obtain a product capable of being again vulcanized and molded or worked into various forms, sizes and shapes or of being utilized as a substitute for leather, linoleum, lincrusta, Walton and other compositions of matter.

In accordance with my present invention I subject the rubber to be devulcanized with or without fiber present, as the case may be, to the action of a mixture of a tar, wood or coal, and most advantageously of a resinous character, and a liquid hydro-carbon in the presence of water and water vapor. After removal of the reagents I wash the treated mass with a detergent solution, preferably alkaline in character, of such strength as not to affect the fiber injuriously, if present.

As an example of my process I may take ground rubber and fiber scrap obtained from auto tires to the amount of 2000 pounds, and place it in a reclaiming kettle or autoclave of 2000 gallons capacity, then filling the kettle to within one-quarter of the top with water. I then add two barrels of pine tar (about 949 pounds) and one barrel of spirits of turpentine (about 48 gallons). It will be evident that the quantities named are only approximate and may be varied somewhat without affecting the invention. The kettle is then closed and heated until a considerable steam pressure is developed, for example, a pressure of 100 pounds, which is maintained for approximately 5 hours. The solution is then run off from the treated rubber, saved for further use, and the kettle is charged with a dilute alkaline detergent solution, for example, a three per cent. caustic soda solution. It is heated to develop a steam pressure of about 55 pounds, at which it is maintained for about 5 hours. It is then dumped and the mass washed in the usual manner and dried. The dried product appears to be mainly fiber, but on milling and sheeting it acquires the appearance of unvulcanized rubber and fiber, and may be utilized in a like manner. The fiber is unimpaired in its strength and durability; in fact it is somewhat improved in these qualities by the treatment to which it has been subjected.

The devulcanization treatment may also be effected without the use of pressure, it being essential, however, that the consistency of the liquid devulcanizing mixture be such as to intermix thoroughly with the particles of rubber, or rubber and fabric, undergoing treatment and inter-act therewith. The pine tar may be replaced by other tar or resinous materials which are capable of assuming a mobile liquid character of greater or less viscosity at the temperature employed, either alone or when associated with a hydro-carbon liquid flux or softener; thus ordinary rosin may be successfully employed. Aliphatic as well as cyclic or other hydro-carbons may be utilized as the liquid, kerosene being an example of those which have been employed.

It has been determined by analyses conducted for the purpose by chemists employed by some of the largest reclaiming plants in the United States that from thirty to fifty per cent. of the combined sulfur existing in the vulcanized product, before treating, was removed by the process hereinbefore described, so that said process effects a more or less complete and true devulcanization.

The opinion has been expressed by parties having knowledge of said tests, that there is no scientific reason why practically all of the combined sulfur can not be removed by this process, or some modification thereof.

The improved process is clearly differentiated from the ordinary reclaiming processes, particularly the alkali process in which the amount of combined sulfur in the product is greater after the reclaiming treatment than it was before, owing to the progressive change of the previously free sulfur into combined sulfur, due to the fact that the high heat of the steam pressure employed is in excess of that required for vulcanization. I have found that a less quantity of pure gum is required to be added to the reclaimed rubber and fiber obtained by my process than is required for the products of other processes, which also shows that by my process there is an effective removal of combined sulfur and elimination of free sulfur. On treating mixed rubber and fiber scrap, as above described, I secure a product wherein the rubber is devulcanized and the fiber is not only not impaired but is actually improved in its qualities, being furthermore impregnated with resinous and tarry materials, which act as preservative agents.

The product obtained as above described may be worked as a new rubber or rubber mixture. By the use of sulfur in varying proportions, accelerators, and pigments products ranging from soft rubber to hard rubber, and of any desired color may be produced. The product lends itself particularly to the production of artificial leathers in which a grain may be produced by passing the material through rolls and to the production of floor coverings and the like.

The process hereinbefore described involves or includes three important features or discoveries, namely:—

1. That wood or coal tar is a devulcanizing agent and under proper conditions will remove combined sulfur from vulcanized rubber as well as free sulfur and restore plasticity to the rubber.

2. That in order to obtain the best results it is advisable to use a liquid hydrocarbon (such as turpentine, kerosene, etc.,) as a flux with the tar, resin or other resinous material employed as a devulcanizing agent. The rubber molecule being a terpene, turpentine shows the best results in the complicated actions which take place during the devulcanizing process, although kerosene and other liquid hydrocarbon may be used.

3. That it is not necessary to destroy fiber contained in the material subjected to the reclaiming process, as is the usual custom at present; but on the contrary by the improved process it is possible to devulcanize the rubber without destroying the fiber and to subsequently save and separate the reclaimed fiber and rubber, when dry, or by suitable means to save and sheet both the rubber and fiber together, and thus form a new composition of matter which can be vulcanized and used for many purposes, for example, the manufacture of shoe soles, heels, puttees, mats, automobile running board mats, a substitute for linoleum, upholstery, automobile tops, shoe uppers, imitation leathers of various kinds, water-proof cloth and water proof floor and wall coverings.

It will be seen that the larger portion of the devulcanizing medium or means which I employ is not initially and primarily of a fluid character but requires the addition of a liquid hydrocarbon as a flux to adapt it to be intimately mixed with the material to be treated and that such medium contains a very considerable amount of relatively high percentage of tar or resinous material.

By the term "devulcanizing" as employed in the foregoing description and following claims I mean the act of withdrawing from vulcanized rubber combined sulfur, the combination of which with the rubber constitutes vulcanization. This is clearly different from and not to be misunderstood to include any and every form of "reclaiming", "regenerating" or producing "plasticization" of vulcanized rubber.

My improved process also does not dissolve the rubber, but removes combined sulfur leaving the rubber in a state similar to that in which it was before sulfur was added and the mixture subjected to the necessary heat to effect vulcanization.

The devulcanizing medium which I employ is a viscous mixture containing a relatively high percentage of tar, in the specific example hereinbefore given amounting to about 47.5% of the amount of rubber scrap treated and approximately 75% of the viscous mixture. Such tar is rendered miscible with the rubber by heat and the addition thereto of a flux of liquid hydrocarbon, said

Having thus described the invention, what is claimed is:

1. The process of devulcanizing rubber which comprises boiling vulcanized rubber with a viscous mixture of a tar and a flux of a liquid hydrocarbon in the presence of water.

2. The process of devulcanizing rubber which comprises boiling vulcanized rubber with a viscous mixture of a tar and a liquid hydrocarbon flux, more than 50% of said mixture being tar, in the presence of water.

3. The process of devulcanizing rubber which comprises boiling vulcanized rubber with a viscous mixture of resinous tar and a flux of a liquid hydrocarbon in the presence of water.

4. The process of devulcanizing rubber which comprises boiling vulcanized rubber with a viscous mixture of resinous tar and a liquid hydrocarbon flux, more than 50% of said mixture being tar, in the presence of water.

5. The process of devulcanizing rubber which comprises boiling vulcanized rubber with a viscous mixture of a resinous material and a liquid hydrocarbon flux, said resinous material constituting more than 50% of the mixture, in the presence of water.

6. The process of devulcanizing rubber which comprises boiling vulcanized rubber with a viscous mixture formed of pine tar and a flux of liquid hydrocarbon, more than 50% of said mixture being tar, in the presence of water.

7. The process of devulcanizing rubber which comprises heating vulcanized rubber with a viscous mixture of pine tar and turpentine, more than 50% of said mixture being tar, in the presence of water.

8. The process of devulcanizing rubber which comprises heating vulcanized rubber with a viscous mixture of resinous tar and a flux of liquid hydrocarbon, more than 50% of said mixture being tar, in the presence of water and water vapor under pressure.

9. The process of devulcanizing rubber which comprises heating vulcanized rubber with a viscous mixture of pine tar and a flux of liquid hydrocarbon, more than 50% of said mixture being tar, in the presence of water and water vapor under pressure.

10. The process of devulcanizing rubber which comprises heating vulcanized rubber with a viscous mixture of pine tar and turpentine in the presence of water and water vapor under pressure.

11. The devulcanizing process which comprises boiling a mixture of vulcanized rubber and fiber with a viscous mixture of pine tar and a flux of liquid hydrocarbon, more than 50% of said mixture being tar, in the presence of water, whereby devulcanization is effected without dissolving the rubber or destroying the fiber.

12. The devulcanizing process which comprises boiling a mixture of vulcanized rubber and fiber with a viscous mixture of resinous tar and a flux of liquid hydrocarbon in the presence of water whereby the rubber is devulcanized without being dissolved and the fiber is not destroyed.

13. The devulcanizing process which comprises boiling a mixture of vulcanized rubber and fiber with a viscous mixture of pine tar and turpentine, more than 50% of said mixture being tar, in the presence of water, whereby the rubber is devulcanized without being dissolved and the fiber is not destroyed.

14. The devulcanizing process which comprises heating a mixture of vulcanized rubber and fiber with a viscous mixture of pine tar and turpentine in the presence of water under pressure.

15. The devulcanizing process which comprises heating a mixture of vulcanized rubber and fiber with pine tar and turpentine and subsequently washing the devulcanized mass with an alkaline detergent solution.

16. The devulcanizing process which comprises heating a mixture of vulcanized rubber and fiber with pine tar and turpentine in the presence of water in the proportion of approximately 2000 pounds of rubber and fiber mixture to approximately 949 pounds of pine tar and 48 gallons of turpentine.

17. The devulcanizing process which comprises heating a mixture of vulcanized rubber and fiber with pine tar and turpentine in the presence of water in the proportion of approximately 2000 pounds of rubber and fiber mixture to approximately 949 pounds of pine tar and 48 gallons of turpentine, and subsequently washing the devulcanized product with an alkaline detergent solution.

18. A reclaimed product comprising an intimate mixture of undissolved, devulcanized, rubber and fiber, impregnated with a resinous material.

19. A reclaimed product comprising an intimate mixture of undissolved devulcanized rubber and fiber impregnated with a resinous tar.

20. The herein described process which comprises treating a mixture of vulcanized rubber and fiber with a viscous mixture adapted to liberate combined sulfur without dissolving the rubber or destroying the fiber, coloring the product thus obtained, adding a suitable vulcanizing compound, sheeting said product and vulcanizing it to produce an article resembling leather.

In testimony whereof I affix my signature.

CYRUS F. WILLARD.